US010750681B2

(12) United States Patent
Toye

(10) Patent No.: US 10,750,681 B2
(45) Date of Patent: Aug. 25, 2020

(54) NETTING MATERIAL WITH EYELETS

(71) Applicant: NINE IP LIMITED, Auckland (NZ)

(72) Inventor: Jonathan Dallas Toye, Auckland (NZ)

(73) Assignee: NINE IP LIMITED, Auckland (NZ)

(*) Notice: Subject to any disclaimer, the term of this patent is extended or adjusted under 35 U.S.C. 154(b) by 914 days.

(21) Appl. No.: 14/889,062

(22) PCT Filed: May 8, 2014

(86) PCT No.: PCT/NZ2014/000084
§ 371 (c)(1),
(2) Date: Nov. 4, 2015

(87) PCT Pub. No.: WO2014/182180
PCT Pub. Date: Nov. 13, 2014

(65) Prior Publication Data
US 2016/0120137 A1    May 5, 2016

(30) Foreign Application Priority Data
May 8, 2013   (NZ) ........................................ 610327

(51) Int. Cl.
*A01G 13/10* (2006.01)
*A01G 22/00* (2018.01)
(Continued)

(52) U.S. Cl.
CPC ............ *A01G 13/10* (2013.01); *A01G 13/02* (2013.01); *A01G 13/0268* (2013.01);
(Continued)

(58) Field of Classification Search
CPC ................ A01G 13/0237; A01G 13/02; A01G 13/0206; A01G 13/0281; A01G 13/0212;
(Continued)

(56) References Cited

U.S. PATENT DOCUMENTS

| 593,654 A | 11/1897 | Headley |
| 805,814 A | 11/1905 | Palmer |
| (Continued) | | |

FOREIGN PATENT DOCUMENTS

| DE | 20 2004 017 455 U1 | 4/2005 |
| EP | 1 716 747 A1 | 11/2006 |
| (Continued) | | |

*Primary Examiner* — Peter M Poon
*Assistant Examiner* — Jeffrey R Larsen
(74) *Attorney, Agent, or Firm* — Seed IP Law Group LLP

(57) ABSTRACT

A netting material having a length dimension and a width dimension much smaller than the length dimension is formed by threads knitted or woven together. The netting material has a main portion comprising knitted or woven apertures, a reinforced edge portion at or adjacent each longitudinal edge of the netting material comprising a longitudinal row of knitted or woven fastening features, and a reinforced intermediate portion between the reinforced edge portions. The reinforced intermediate portion has a first longitudinal row of knitted or woven fastening features and a corresponding second longitudinal row of knitted or woven fastening features. In use, the netting material is folded so that the first longitudinal row of fastening features and the second longitudinal row of fastening features are brought together to form a double-layered row of fastening features. The double-layered row of fastening features and the row of fastening features of the reinforced edge portions provide three longitudinal attachment locations for securing the netting material to a support structure.

21 Claims, 12 Drawing Sheets

(51) Int. Cl.
*A01M 29/30* (2011.01)
*A01G 13/02* (2006.01)
*A01G 13/00* (2006.01)

(52) U.S. Cl.
CPC ........... *A01G 13/105* (2013.01); *A01G 22/00* (2018.02); *A01M 29/30* (2013.01); *A01G 13/0225* (2013.01); *A01G 2013/006* (2013.01)

(58) Field of Classification Search
CPC .. A01G 13/0268; A01G 13/10; A01G 9/1438; A01G 13/0225; A01G 2013/002; A01G 13/04; A01G 2013/006; Y10T 428/24008; B60P 7/04; B60P 7/0876; B60J 7/10; B60J 11/04
USPC ......... 47/20.1, 31, 31.1; 296/100.18, 100.15, 296/100.16; 135/90
See application file for complete search history.

(56) References Cited

U.S. PATENT DOCUMENTS

| | | | |
|---|---|---|---|
| 1,051,692 A | | 1/1913 | Cowart |
| 1,106,624 A | | 8/1914 | Cadwallader et al. |
| 1,283,452 A | * | 11/1918 | Bardin ................. A01G 13/043 47/29.6 |
| 1,342,234 A | * | 6/1920 | Smith ..................... E04H 15/04 135/120.4 |
| 2,015,471 A | | 9/1935 | Genuit |
| 2,028,060 A | | 1/1936 | Gilbert |
| 2,028,220 A | | 1/1936 | Kelly |
| 2,051,643 A | | 8/1936 | Morrison |
| 2,118,474 A | | 5/1938 | Morton |
| 2,251,624 A | | 8/1941 | Foree et al. |
| 2,401,997 A | | 6/1946 | Whitman |
| 3,339,309 A | | 9/1967 | Stone |
| 3,374,797 A | | 3/1968 | Neumark |
| 3,482,609 A | | 12/1969 | Neckerman |
| 3,769,747 A | | 11/1973 | Chapman, Jr. |
| 4,044,501 A | * | 8/1977 | Frydryk ............. A01G 13/0268 428/121 |
| 4,065,889 A | | 1/1978 | Fraioli |
| 4,100,706 A | | 7/1978 | White |
| 4,537,210 A | | 8/1985 | Montgomery |
| 4,763,440 A | | 8/1988 | James |
| 4,852,194 A | | 8/1989 | Langan |
| 5,052,686 A | | 10/1991 | Pryor |
| 5,083,396 A | | 1/1992 | Traut |
| 5,097,624 A | | 3/1992 | Klayman et al. |
| D331,864 S | | 12/1992 | Sciubba |
| 5,199,215 A | | 4/1993 | Lopez |
| 5,419,376 A | * | 5/1995 | Hawkins .................. D03D 1/00 139/22 |
| 5,451,445 A | | 9/1995 | Wang |
| D386,653 S | | 11/1997 | Brown |
| 5,763,031 A | * | 6/1998 | Huang ..................... D06N 7/00 139/384 R |
| 9,788,639 B2 | | 10/2017 | Frazer et al. |
| 2002/0043543 A1 | | 4/2002 | McMurray et al. |
| 2003/0121202 A1 | | 7/2003 | Hinsperger |
| 2004/0088914 A1 | | 5/2004 | Warner |
| 2007/0194583 A1 | | 8/2007 | Coles et al. |
| 2008/0072944 A1 | | 3/2008 | Wu |
| 2011/0113683 A1 | | 5/2011 | Morgan |
| 2013/0219783 A1 | * | 8/2013 | Toye ................. A01G 13/0206 47/31 |
| 2015/0064415 A1 | | 3/2015 | Verlinde et al. |
| 2015/0201565 A1 | | 7/2015 | Toye |
| 2015/0351330 A1 | | 12/2015 | Toye et al. |

FOREIGN PATENT DOCUMENTS

| | | |
|---|---|---|
| EP | 1 728 417 A2 | 12/2006 |
| WO | 2010/120201 A2 | 10/2010 |

* cited by examiner

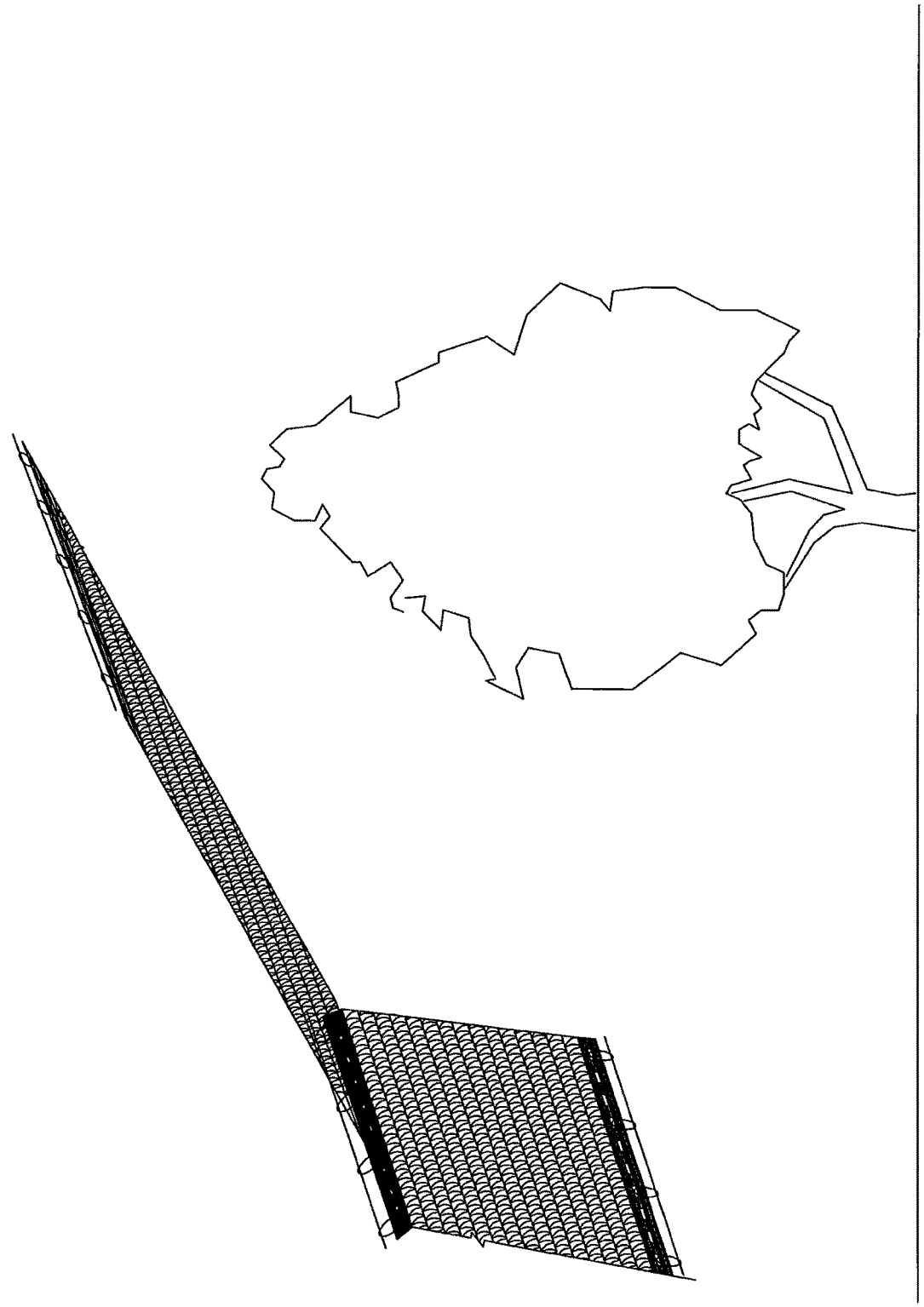

NETTING MATERIAL WITH EYELETS

FIELD OF INVENTION

The invention relates to netting materials and particularly but not exclusively to netting materials for use as bird netting, insect netting, shade netting, wind screen netting, or hail protection netting for example or in other agricultural applications.

BACKGROUND

Bird netting, insect netting, shade netting, wind screen netting, or hail protection netting may be placed near plants to protect for example annual plants, perennial plants, fruit trees, or grape vines, from birds, insects, excessive sun, wind, or hail. Typically the netting is supported over the plant(s) and/or as a vertical and/or angled wall or walls near the plant(s), by for example cables or wires between posts positioned along the rows of plants in a garden, field crop, orchard or vineyard, or is draped over the plant(s) or is laid on the ground.

SUMMARY OF INVENTION

In one aspect the invention consists in a netting material having a length dimension and a width dimension much smaller than the length dimension, the netting material formed by threads knitted or woven together, the netting material comprising:
  a main portion comprising knitted or woven apertures,
  a reinforced edge portion at or adjacent each longitudinal edge of the netting material comprising a longitudinal row of knitted or woven fastening features, and
  a reinforced intermediate portion between the reinforced edge portions comprising a first longitudinal row of knitted or woven fastening features and a corresponding second longitudinal row of knitted or woven fastening features, the first longitudinal row of fastening features and the second longitudinal row of fastening features spaced apart side-by-side in a lateral direction of the netting so that, in use, folding the reinforced intermediate portion of the netting along a longitudinal fold line between the two rows of fastening features brings the first longitudinal row of fastening features and the second longitudinal row of fastening features together to form a double-layered row of fastening features, the double-layered row of fastening features and the row of fastening features of the reinforced edge portions providing three longitudinal attachment locations for securing the netting material to a support structure.

In some embodiments the main portion of the netting is formed by a first knitted or woven construction forming the apertures, and
  each reinforced edge portion is formed by a second knitted or woven construction forming the longitudinal row of fastening features, and
  the reinforced intermediate portion is formed by a third knitted or woven construction forming the first and second longitudinal rows of eyelets.

In some embodiments the third knitted or woven construction comprises a knit or weave pattern repeated side-by-side.

In some embodiments the second knitted or woven construction comprises a knit or weave pattern, and the third knitted or woven construction comprises the knit or weave pattern repeated side-by-side.

In some embodiments the knit or weave pattern is a knit pattern comprising a pillar knitted construction, pillars of the pillar knitted construction arranged longitudinally along the netting material, and the fastening features are eyelets formed between two adjacent pillars.

In some embodiments a spacing between pillars in the pillar knitted construction is less than 12 mm, 10 mm, or 8 mm, or 6 mm, or 5 mm, or 4 mm, or 3 mm, or 2 mm, or 1 mm.

In some embodiments the first knitted or woven construction comprises a first knit or weave pattern and the second knitted or woven construction comprises a second knit or weave pattern, and the density of the second knit or weave pattern is higher than the density of the first knit or weave pattern.

In some embodiments the first knitted or woven construction comprises one or more of hexagonal, diamond or triangular apertures.

In some embodiments the reinforced intermediate portion is a longitudinal central region of the netting material. In some embodiments the reinforced intermediate portion is located nearer to one longitudinal edge that the other longitudinal edge.

In some embodiments the fastening features of the reinforced edge portions are eyelets. In some embodiments the fastening features of the reinforced intermediate portion are eyelets.

In some embodiments the strength of the second knitted or woven construction is greater than the strength of the third knitted or woven construction.

In some embodiments threads of the third knitted or woven construction comprise a first strand and threads of the second knitted or woven construction comprise a said first strand and at least one additional strand.

In some embodiments threads of the second knitted or woven construction comprise one additional strand.

In some embodiments threads of the second knitted or woven construction comprise more than one additional strand.

In some embodiments threads of the second knitted or woven construction comprise two additional strands.

In some embodiments a said additional strand has the same weight and material as the first strand.

In some embodiments a said additional strand is heavier than the first strand.

In some embodiments a cross sectional area of a said additional strand is at least twice the cross sectional area of the first strand.

In some embodiments the weight of the first strand is 100 to 400 denier and the weight of a said additional strand is 200 to 1000 denier.

In some embodiments the weight of the first strand is 200 to 300 denier and the weight of a said additional strand is 400 to 600 denier.

In some embodiments the weight of a said additional strand is at least twice the weight of the first strand.

In some embodiments threads of the first knitted or woven construction and the third knitted or woven construction comprise a single first strand.

In some embodiments threads of the first knitted or woven construction and the third knitted or woven construction comprise a single strand and threads of the second knitted or woven construction comprise two said strands.

In some embodiments threads of the first knitted or woven construction and the third knitted or woven construction comprise a single strand and threads of the second knitted or woven construction comprise three said strands.

In some embodiments the first knitted or woven construction, the second knitted or woven construction and the third knitted or woven construction are knitted from the same type of thread comprising at least one strand.

In some embodiments the thread comprises a single strand.

In some embodiments the strand has a denier of 200 to 600, or 250, or 300, or 350, or 400, or 450, or 500.

In some embodiments the threads of the first knitted or woven construction comprise a single first strand and threads of the second knitted or woven construction and the third knitted or woven construction comprise a single second strand, and the second strand is heavier than the first strand.

In some embodiments the weight of the first strand is 200 to 300 denier and the weight of the second strand is 400 to 600 denier.

In some embodiments the weight of the first strand is 250 denier and the weight of the second strand is 500 denier.

In some embodiments each said strand is a monofilament.

In some embodiments the netting material is bird netting, or insect netting, or shade netting, or wind screen netting, or hail protection netting.

In one aspect the invention consists in a method of treating a plant or fruit or vegetables thereon which comprises providing over and/or adjacent the plant as bird netting, insect netting, shade netting, wind screen netting, or hail protection netting a netting material according to any one or more of the above statements.

In one aspect the invention consists in a netting material having a length dimension and a width dimension much smaller than the length dimension, the netting material formed by knitted or woven threads, the netting material comprising:

a first knitted or woven construction comprising knitted or woven apertures formed by knitted or woven threads, the first construction forming a main portion of the netting material, a second knitted or woven construction at or adjacent each longitudinal edge of the netting material forming a reinforced edge portion at or adjacent each longitudinal edge comprising a longitudinal row of eyelets formed by knitted or woven threads of the second construction, the eyelets spaced apart in a longitudinal direction of the netting material, a third knitted or woven construction forming a reinforced intermediate portion comprising a first longitudinal row of eyelets and a corresponding second longitudinal row of eyelets formed by knitted or woven threads of the third construction, the first longitudinal row of eyelets and the second longitudinal row of eyelets spaced apart side-by-side in a lateral direction of the netting so that, in use, folding the third construction of the netting along a longitudinal fold line brings the first longitudinal row of eyelets and the second longitudinal row of eyelets together to form a double-layered row of eyelets, the double-layered row of eyelets and the row of eyelets of the second construction at each longitudinal edge of the netting material providing three longitudinal attachment locations for securing the netting material to a support structure. The netting material of this aspect may comprise features described in any one or more of the statements above in relation to the first aspect.

In some embodiments the netting material is bird netting. In some embodiments the netting material is insect netting. In some embodiments the netting is shade netting. In some embodiments the netting material is wind screen netting. In some embodiments the netting material is hail protection netting. A bird netting comprises apertures that are of sufficiently small size to prevent birds passing through the netting. An insect netting comprises apertures that are of sufficiently small size to prevent insects passing through the netting. A shade netting comprises apertures that are of sufficiently small size to provide shading from the sun to an area being protected by the netting material. For example a shade netting may comprise a cover factor (defined below) up to 90%. A wind screen netting comprises apertures that are of sufficiently small size to reduce the speed or force of wind or breeze. For example a wind screen netting may comprise a cover factor up to 90%. A hail protection netting comprises apertures that are of sufficient size to prevent hail stones penetrating the netting to cause damage beneath the netting. Such a netting material is constructed of a sufficient strength to prevent hail stones from breaking through the netting at expected velocities or reduce the speed to a more acceptable non damaging level.

The term "netting" means material having a cover factor (as herein defined) of up to 90% but typically less than 80%, 70%, 60%, 50%, 40%, 30%, 25%, 20%, 15%, 10% or 5% or 2%.

The phrase "cover factor" means the percentage of the overall area of the netting material which comprises knitted monofilament, yarn, or tape or a combination, forming the netting itself, judged from perpendicular to the plane of the netting when laid out flat, as opposed to air space in between the netting. Thus if a netting has a cover factor of 30% then the air space through the netting would be 70% of the total area of the netting.

The term "comprising" as used in this specification and means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

The invention is further described by way of example with reference to the accompanying schematic drawings in which:

FIG. 11C is a part view of another netting material in use with a non-central reinforced intermediate portion folded to form a double-layered row of eyelets for securing the netting material in place over a plant.

DETAILED DESCRIPTION OF EMBODIMENTS

Netting material of the invention may be knitted or woven from one or more threads, for example warp threads and/or weft threads. Each thread may comprise one or more strands. A strand may be a synthetic monofilament, a yarn (natural or synthetic fibre multifilament), or a tape. Tape may for example be formed by extruding synthetic sheet material from a resin, and then cutting the extruded sheet material to form long tapes of typically 1 mm to 5 mm of width. The multiple strands of a thread may or may not be twisted or held together prior to being knitted into a netting material.

FIGS. 1 to 8 show by way of example sections of netting material.

Figure 1:
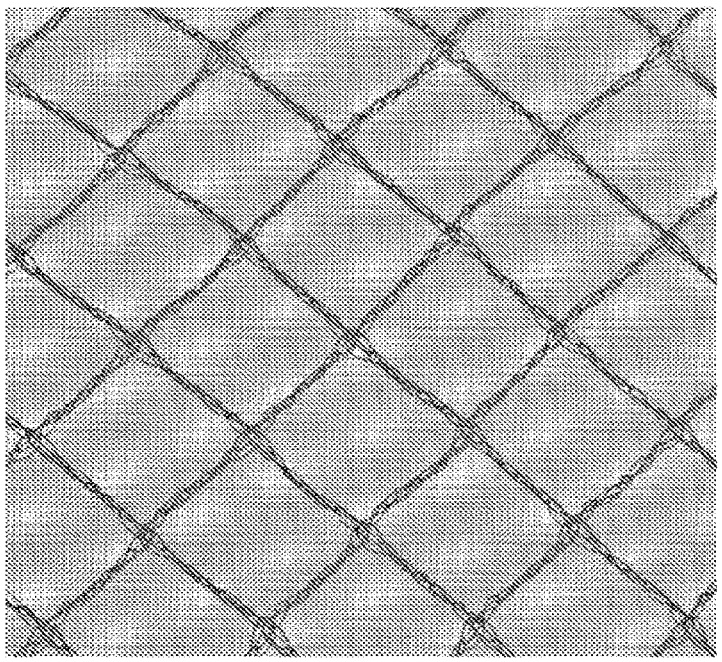
FIG. 1 shows a section of one form of knitted diamond monofilament netting, having a cover factor of approximately 10-12%

FIG. 1 shows a section of one form of knitted diamond monofilament netting. The netting has a cover factor of approximately 10-12%. The netting is knitted in a diamond structure of around 18 mm across.

Figure 2:
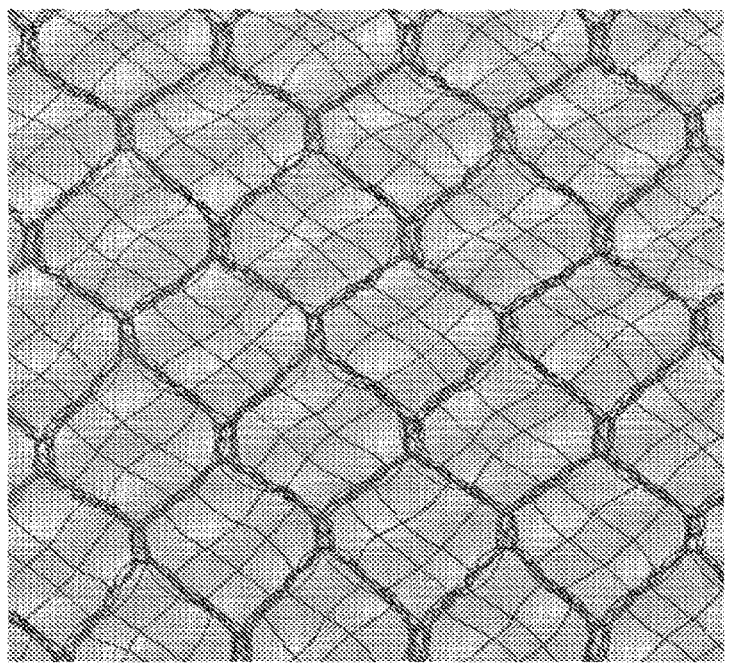
FIG. 2 shows a section of another form of knitted diamond monofilament netting, with four cross over yarns having a cover factor of approximately 22-28%

FIG. 2 shows a section of another form of knitted diamond monofilament netting with four cross over yarns. The netting has a cover factor of approximately 22-28%. The netting is knitted in a diamond structure of around 16 mm across but with four additional strands of monofilament across the diamond.

Figure 3:
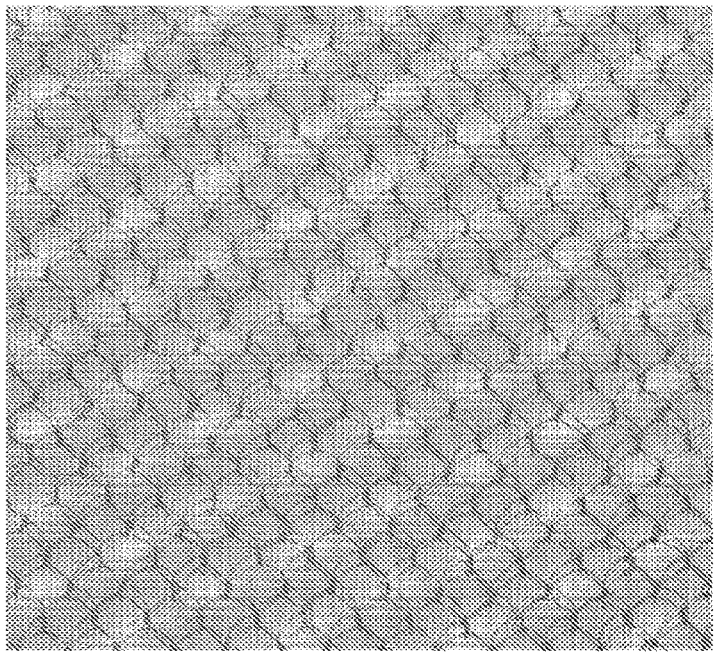
FIG. 3 shows a section of another form of knitted diamond monofilament netting, having a cover factor of approximately 22-30%

FIG. 3 shows a section of a form of knitted diamond shaped monofilament netting. The netting has a cover factor of approximately 22-30%. The netting is knitted in a diamond shaped structure of around 4-5 mm across.

Figure 4:
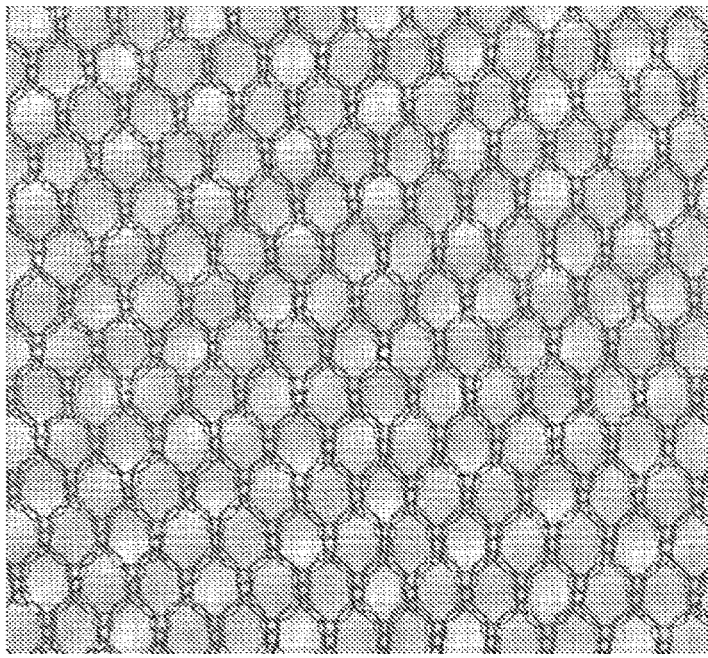
FIG. 4 shows a section of one form of knitted hexagonal monofilament netting, having a cover factor of approximately 20-25%

FIG. 4 shows a section of one form of knitted hexagonal monofilament netting. The netting has a cover factor of approximately 20-25%. The netting is knitted in a hexagonal structure of around 8 mm across the hexagonal apertures.

Figure 5:
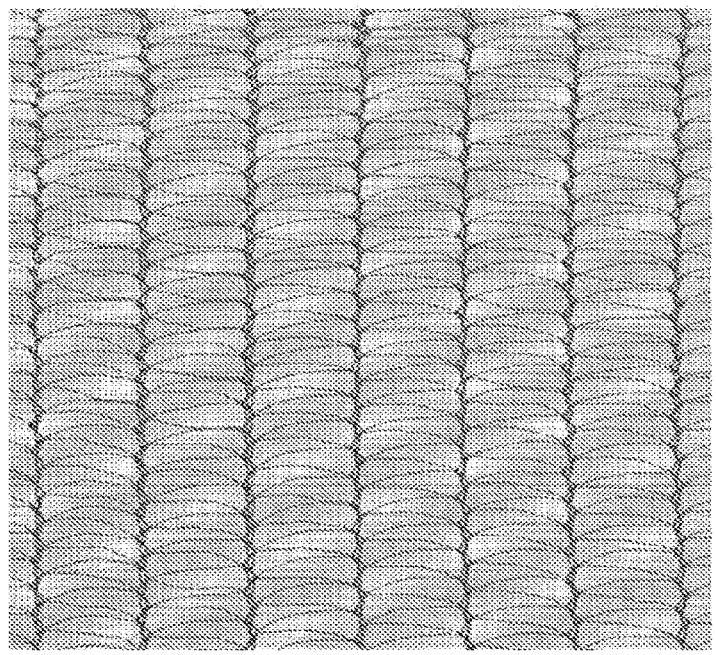
FIG. 5 shows a section of a form of knitted pillar based monofilament netting, having a cover factor of approximately 20-30%.

FIG. 5 shows a section of a form of knitted pillar based monofilament netting. The netting has a cover factor of approximately 20-30%. The pillars are joined by knitted monofilaments across the pillars.

Figure 6:
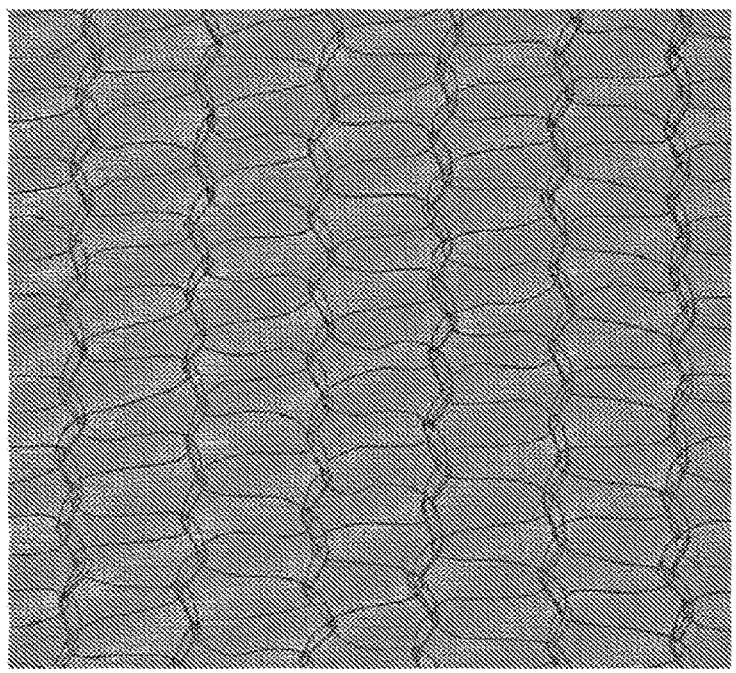
FIG. 6 shows a section of another form of knitted pillar based monofilament netting, having a cover factor of approximately 18-22%.

FIG. 6 shows a section of another form of knitted pillar based monofilament netting. The netting has a cover factor of approximately 18-22%. The pillars are similar size to FIG. 5 and are joined by monofilaments that loop through the pillars.

Figure 7:
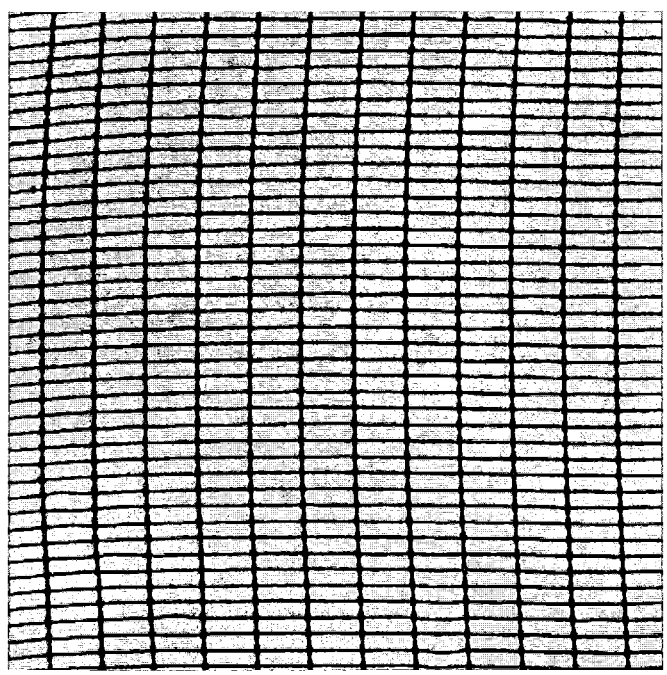
FIG. 7 shows a section of one form of knitted monofilament netting, having a cover factor of approximately 20-25%.

FIG. 7 shows a section of one form of woven monofilament netting. The netting has a cover factor of approximately 20-25%, with small apertures.

Figure 8:
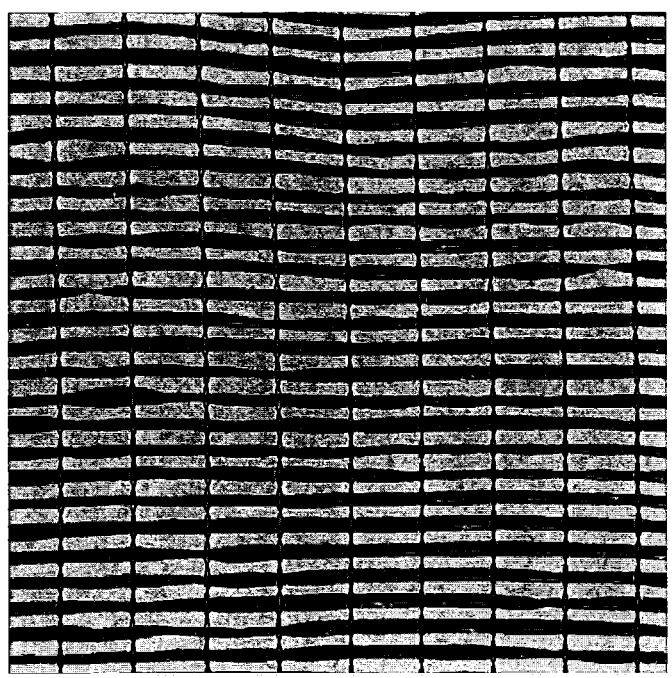
FIG. 8 shows a section of one form of knitted monofilament netting, having a cover factor of approximately 50-55%.

FIG. 8 shows a section of one form woven monofilament netting. The netting has a cover factor of approximately 50-55%, with smaller apertures.

In some embodiments netting of the invention may comprise air space apertures through the material of widest dimension about 30 mm. In other embodiments netting of the invention may comprise air space apertures through the material of widest dimension about 20 mm. In some embodiments netting of the invention may comprise apertures through the material of widest dimension in the range 1-30 mm.

Typically the netting is supported over the plant(s) and/or as a vertical and/or angled wall or walls near the plant(s), or on the ground itself, by for example cables or wires between posts positioned along the rows of plants in a garden, field crop, orchard or vineyard, or is draped over the plant(s) as bird netting, insect netting (for repelling for example mosquitoes, or as for example bee exclusion netting), shade netting, windbreak netting, or hail protection. Netting may be placed near plants to protect for example annual plants, perennial plants, fruit trees, or grape vines, vegetable plants, from birds, insects, excessive sun, wind, or hail.

Cables or wires or ropes or other securing devices or fasteners are coupled to the netting to anchor the netting to the ground or support structure. The apertures of the netting material may not provide sufficient strength to allow fasteners to hook or secure directly to or through the apertures of the netting. For securing the netting material in place, eyelets are integrally knitted into the netting material. Cables or wires or ropes or other securing devices or fasteners tie to or pass through or hook or otherwise engage with the eyelets.

Various embodiments of a netting material according to the present invention are described with reference to FIGS. 9A to 13.

For securing the netting material in place, fastening features are integrally knitted or woven into the netting material. The fastening features are formed in a reinforced portion of the netting material. For example, in some embodiments the fastening features are eyelets. The eyelets are apertures formed in a reinforced portion of the netting. For example, in FIG. 9, the netting material 10 comprises a reinforced longitudinal edge region 21 in which eyelets 22 are formed. The edge region is at or adjacent to a longitudinal edge of the netting material. The eyelets 22 are knitted in the reinforced portion of the netting so that the eyelets are of a higher strength compared to the apertures 12 in the main portion 11 of the netting. In some embodiments the fastening features may be loops of thread integrally knitted or woven in the reinforced portion of the netting. The loops of thread may extend out from a general plane of the netting material. Fasteners such as hooks may extend through the loops of thread to secure the netting material to a support structure. In some embodiments the fastening features integrally formed with the knitted or woven edge region may be areas of high density weave or knit through which a fastener such as a hook or loop may be pushed. In a woven embodiment, the fastening feature may be slots or gaps arranged longitudinally formed by a missing warp thread or threads, the slots or gaps spaced apart by warp threads.

The fastening features are spaced apart along the longitudinal length of the netting. For example the fastening features are spaced apart by a longitudinal distance of 2 mm to 300 mm, or 10 mm to 200 mm, or 10 mm to 100 mm, or 10 mm to 50 mm, or 10 mm to 40 mm, or 10 mm to 30 mm, or 10 mm to 20 mm. In some embodiments the longitudinal spacing of the fastening features is 10 mm, or 11 mm, or 12 mm, or 13 mm, or 14 mm, or 15 mm.

In some embodiments the fastening features are eyelets formed as narrow openings, for example an eyelet may have a width of 2 mm to 5 mm wide and a length of 2 mm to 20 mm. In some embodiments the length of the eyelet is aligned with a longitudinal direction of the netting material as shown in FIG. 9. In some embodiments the eyelets have a length of 10 mm, or 11 mm, or 12 mm, or 13 mm, or 14 mm or 15 mm. In some embodiments the length of the eyelets is equal to the spacing between adjacent eyelets.

To reinforce the reinforced region 21 of the netting, the reinforced portion 21 is knitted with a different knitted construction compared to the unreinforced portion of the netting which forms the main part 11 of the netting for protecting plants. The main portion 11 comprises a first knitted construction comprising knitted apertures 12. The reinforced portion 21 of the netting comprises a second knitted construction comprising knitted fastening features 22.

To strengthen the reinforced portion of the netting, in some embodiments the reinforced portion may comprise a different knit or weave pattern to the main portion of the netting material. For example, in some embodiments the main portion 11 of the netting comprises a first knit or weave pattern and the reinforced portion 21 comprises a second knit or weave pattern. For example, the density of the second pattern may be higher than the density of the first pattern to strengthen the reinforced portion to provide eyelets 22 with increased strength compared to the apertures 12 of the main part of the netting. For example, the reinforced portion of the netting may comprise a pillar knitted pattern with pillars 23 (FIG. 10A) spaced closely together, and the main portion of the netting may comprise a pillar knitted pattern with pillars 13 spaced further apart. The spacing between pillars in the reinforced portion of the netting of FIG. 9A may be less than 12 mm, 10 mm, or 8 mm, or 6 mm, or 5 mm, or 4 mm, or 3 mm, or 2 mm, or 1 mm. In some embodiments the eyelets 22 are formed between two adjacent pillars of the reinforced portion of the netting, as illustrated in FIG. 10A. In some embodiments, the reinforced portion of the netting may comprise rectangular apertures and the main portion of the netting may comprise one or more of hexagonal, diamond or triangular apertures. In some embodiments the reinforced portion of the netting may comprise a pillar knit or weave pattern and the main portion of the netting may comprise a non-pillar knit or weave pattern, for example comprising one or more of hexagonal, diamond or triangular apertures. With reference to FIG. 10B, in a woven netting material the reinforced edge region 21 may comprise high density areas formed by warp tapes 40 spaced closer together than warp tapes 41 of the main portion 11 of the netting. Fastening features 42 may be formed by a gap between high density areas 40 in the reinforced portion where no warp thread is provided. Weft threads 43 extend across the fastening gap. Fastening features are slots or gaps between the weft threads 42 in the gap between adjacent high density areas formed by warp tapes 40 spaced closely together.

In some embodiments the main portion of the netting and the reinforced portion of the netting comprising fastening features may both be knitted or woven from the same type of thread. In some embodiments, reinforcement of the reinforced portion of the netting is achieved by using a different knit or weave pattern to the main portion of the netting only.

To strengthen the reinforced portion of the netting, in addition to or alternatively to a different knit or weave pattern to the main portion of the netting, in some embodiments the reinforced portion may comprise threads with an additional number of strands compared to threads of the main portion of the netting. For example, the main portion of the netting comprising the first knitted or woven construction may be knitted with threads comprising a single strand, and the reinforced portion comprising the second knitted or woven construction may be knitted with threads comprising two or more strands. In some embodiments, threads of the first knitted or woven construction comprise a single strand and threads of the second knitted or woven construction comprise two said strands. In some embodiments, threads of the first construction comprise a single strand and threads of the second construction comprise three said strands. In some embodiments threads of the first construction comprise a first strand and threads of the second construction comprise a said first strand and at least one additional strand. For example, threads of the second knitted or woven construction comprise one additional strand, or more than one additional strand, or two additional strands.

In some embodiments, a said additional strand may have the same weight and material as the first strand. For example, threads of the first knitted or woven construction may comprise a single first strand and threads of the second knitted or woven construction comprise two said first strands.

In some embodiments, a said additional strand is heavier than the first strand. For example, a cross sectional area of a said additional strand is at least twice the cross sectional area or thickness of the first strand. For example, threads of the first knitted or woven construction may comprise a first strand having a first cross sectional area and threads of the second construction may comprise a said first strand and a second strand comprising a second cross sectional area that is at least twice the first cross sectional area. In some embodiments, the weight of the first strand is 100 to 400 denier and the weight of a said additional strand is 200 to 1000 denier. For example, the weight of the first strand is 250 denier and the weight of a said additional strand is 500 denier. In some embodiments, the weight of a said additional strand is at least twice the weight of the first strand.

To strengthen the reinforced portion of the netting, in addition to or alternatively to a different knit or weave pattern to the main portion of the netting, in some embodiments the reinforced portion may be knitted or woven using a stronger or heavier thread. For example, the main portion of the netting comprising the first construction may be knitted or woven with threads comprising a single 250 denier strand, and the reinforced portion comprising the second construction may be knitted or woven with threads comprising a single 500 denier strand.

The netting material comprises a reinforced intermediate region 31. The reinforced intermediate region is a longitudinal region of the netting material located between the longitudinal edges of the netting (or between two reinforced edge regions 21 of the netting). For example, in the embodiment of FIG. 9A, the reinforced intermediate region is a longitudinal central region of the netting material.

The longitudinal reinforced intermediate region 31 comprises two longitudinal rows of fastening features 32, a first longitudinal row 35*a* and a second corresponding longitudinal row 35*b*. The present invention will be described with reference to a preferred embodiment wherein the fastening features are eyelets, however other fastening features such as loops of thread integrally knitted or woven in the reinforced portion of the netting, or areas of high density weave or knit through which a fastener such as a hook or loop may be pushed or pierced. In a woven embodiment, the fastening feature may be slots or gaps arranged longitudinally formed by a missing warp thread or threads, the slots or gaps spaced apart by warp threads.

Figure 9A:
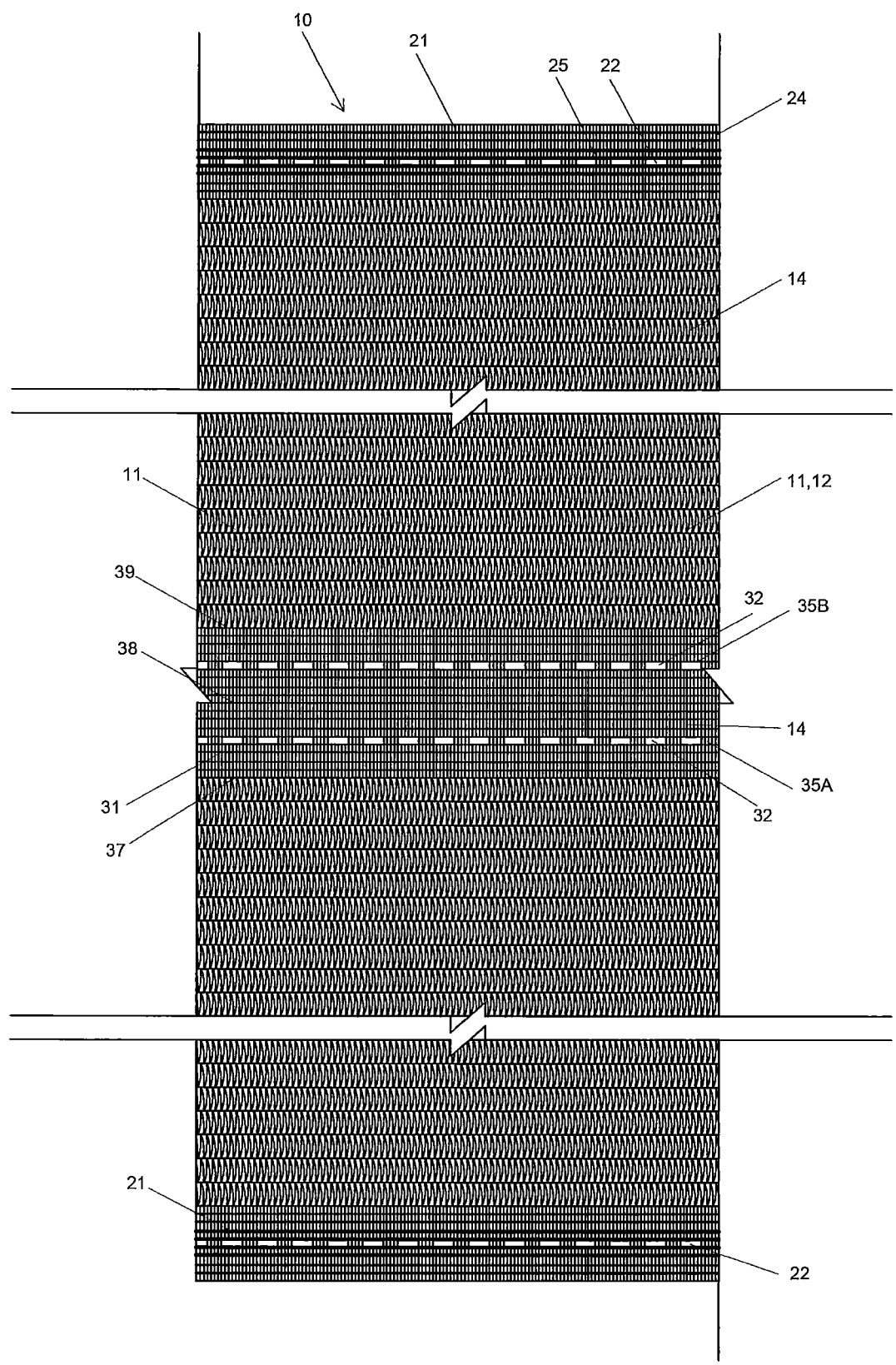
FIG. 9A shows a netting material according to some embodiments of the present invention with a reinforced intermediate portion positioned centrally in the netting material.
Figure 9B:
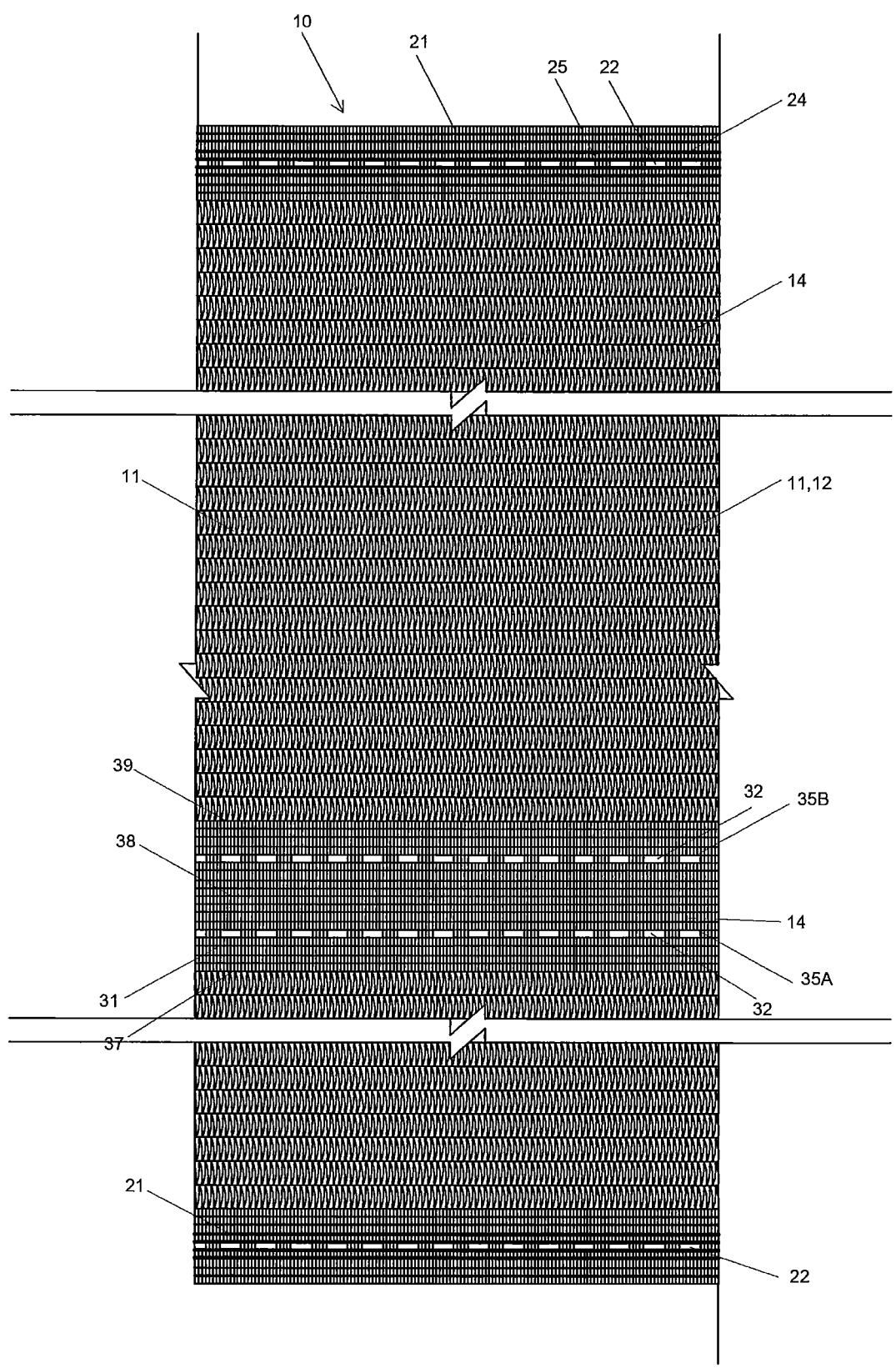
FIG. 9B shows a netting material according to some embodiments of the present invention with a reinforced intermediate portion positioned closer to one longitudinal edge than the other longitudinal edge.
Figure 10A:
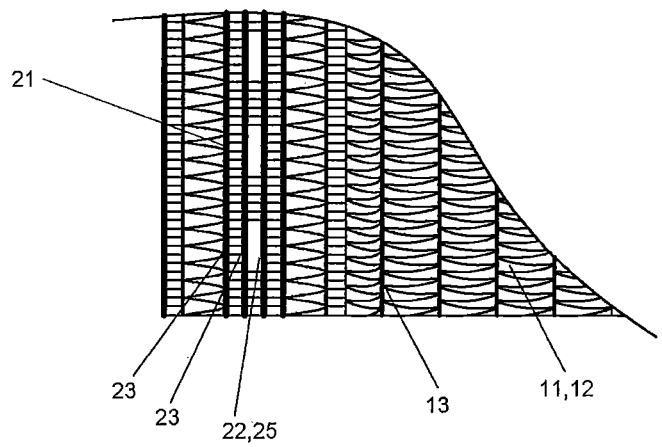
FIG. 10A is a part view of the netting of FIG. 9 showing a reinforced edge region of the netting material comprising eyelets for securing the netting material in place over a plant.
Figure 10B:
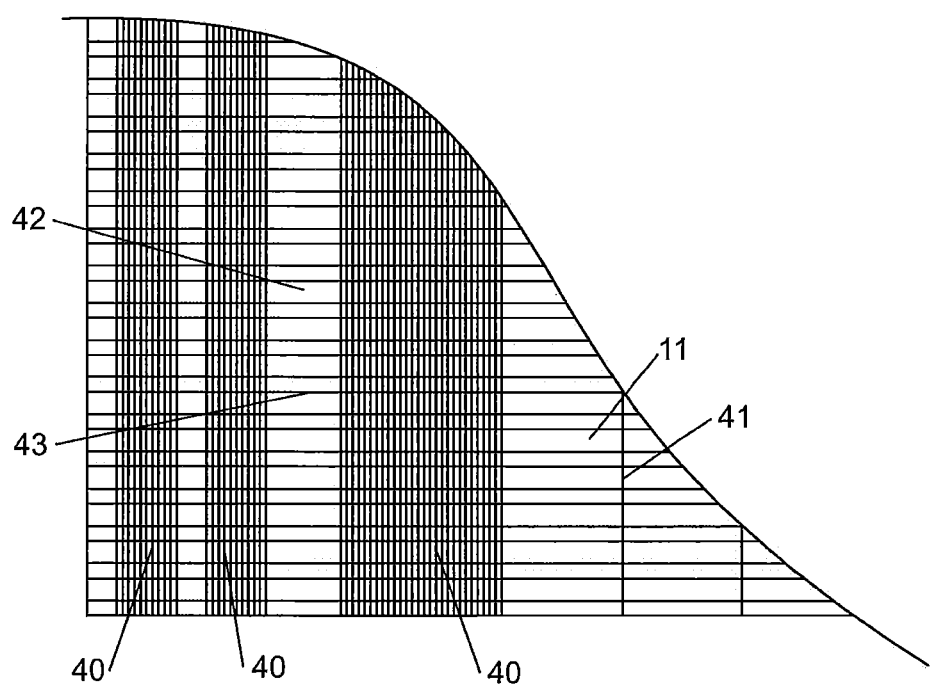
FIG. 10B is a part view of a netting material that is woven from warp and weft threads with a reinforced edge region of the netting material comprising fastening features for securing the netting material in place over a plant.

The reinforced intermediate region comprising a first longitudinal row of fastening features and a second corresponding row of fastening features may not necessarily be positioned in the centre of the netting material; the embodiment of FIG. 9A is provided by way of example only. In some embodiments, the netting material may comprise the reinforced intermediate region located between the centre of the netting material and a longitudinal edge of the netting material. That is the reinforced intermediate region may be positioned close to one longitudinal edge than the other longitudinal edge, for example as shown in FIG. 9B.

Figure 11A:
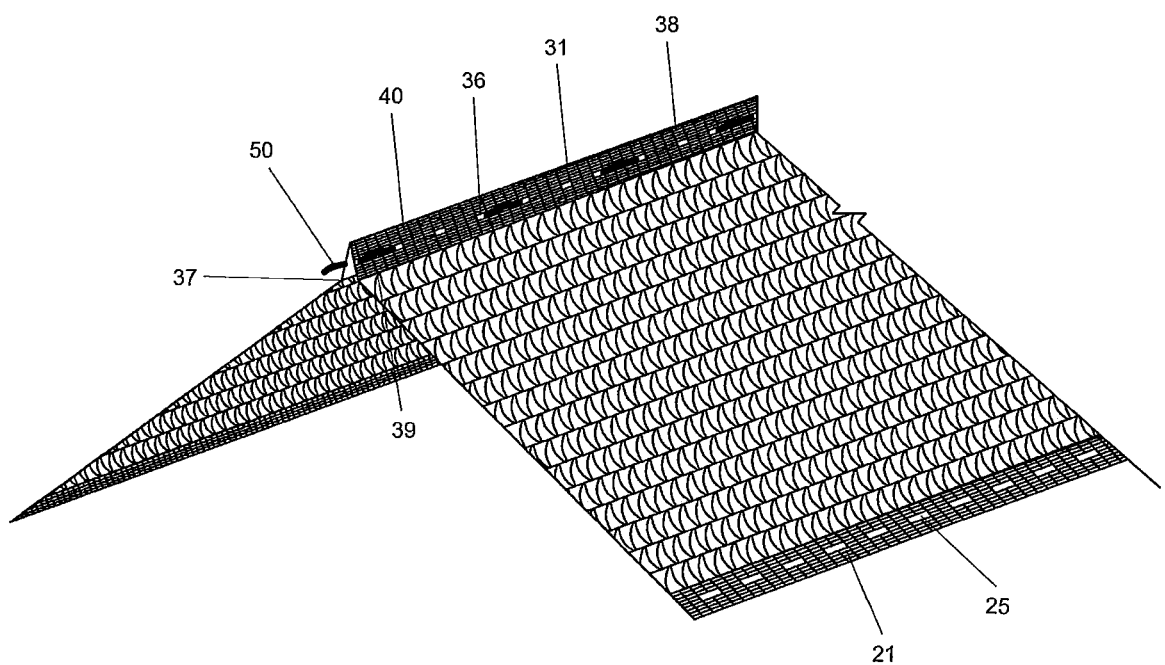
FIG. 11A is a part view of the netting material of FIG. 9 showing the netting material in use with a central second reinforced portion folded to form a double-layered row of eyelets for securing the netting material in place over a plant.
Figure 11B:
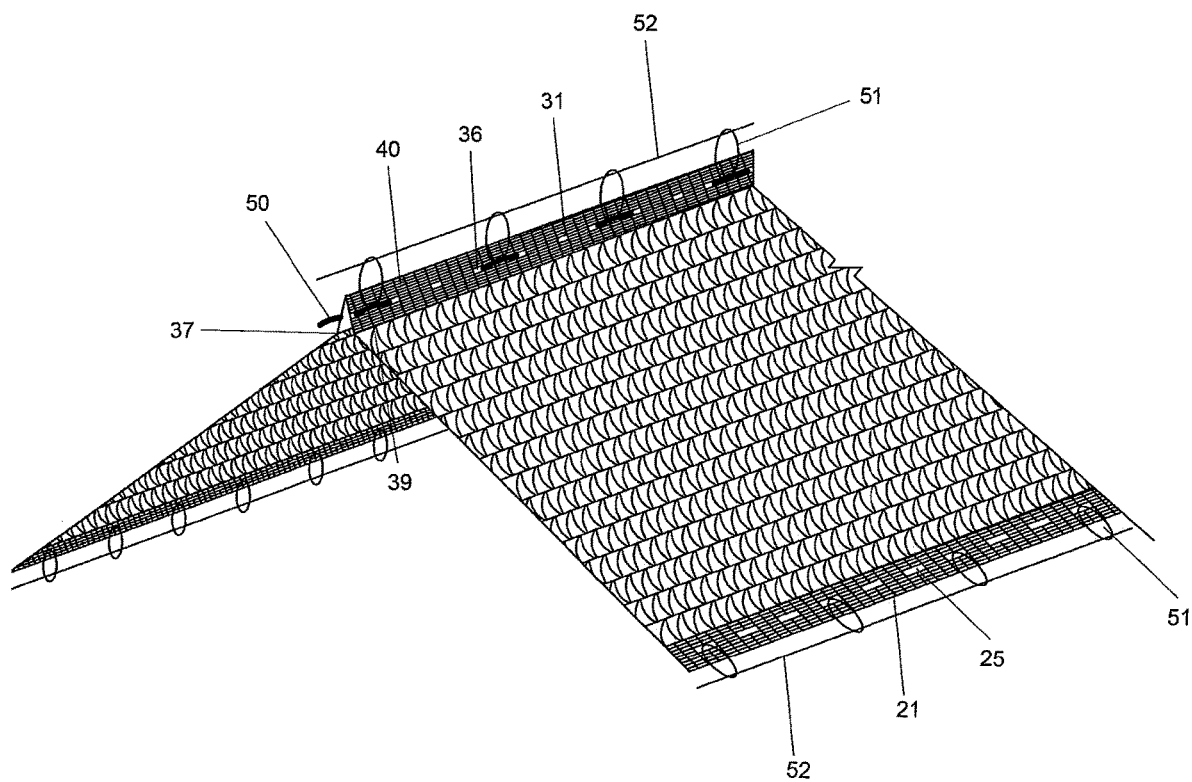
FIG. 11B is a part view of the netting material of FIG. 9 showing the netting material in use with a central second reinforced portion folded to form a double-layered row of eyelets for securing the netting material in place over a plant.

With reference to the embodiment of FIG. 9A, in use, the reinforced intermediate portion may be folded about longitudinal lines 37, 38 and 39 to form a double-layered area 40 as shown in FIGS. 11A and 11B. In folding the netting to form double-layered area 40, the two corresponding rows of eyelets 35*a*, 35*b* in the reinforced intermediate region of the netting material are brought together so that they form a single double-layered row 36 of eyelets 35*a*, 35*b*. In use, a wire 50 may be threaded along the row of double-layered eyelets for hanging the netting from the double-layered area 40 over plants from a support structure. In use, the wire 50 may be threaded along the row of double-layered eyelets to maintain the two rows of eyelets 35*a* and 35*b* together.

In some embodiments, the construction of each half of the reinforced intermediate region may be the same as the construction of the reinforced edge regions of the netting material. With reference to FIG. 9, the construction of the reinforced intermediate region between lines 37 and 38, and between lines 38 and 39, may be the same as the construction of the reinforced edge region of the netting at each longitudinal edge of the netting material. For example, the first and second reinforced portions of the netting may be knitted or woven from the same type of thread and may comprise the same knit or weave pattern, the pattern of the reinforced edge region repeated side-by-side in the reinforced intermediate region.

In preferred embodiments the netting material comprises a reinforced edge region comprising a longitudinal row 25 of eyelets at each longitudinal edge region of the netting material, and a reinforced intermediate region comprising a double-layered row 36 of eyelets 35*a*, 35*b* located between the edge regions of the netting material. The rows of eyelets 25, 25, and 36 provide three longitudinal attachment locations for securing the netting material in place over plants. One attachment location comprising a longitudinal row 25 of eyelets is provided adjacent each longitudinal edge of the netting material, and a third attachment location comprising a double-layered row 36 of eyelets is provided between the longitudinal edges of the netting material. In FIGS. 11A and B the third attachment location comprising double-layered row of eyelets is provided at a centre region of the netting material. FIG. 11C illustrates another example netting material where the reinforced intermediate region (the third attachment location) is located closer to one longitudinal edge than the other longitudinal edge.

In some embodiments the netting material may comprise more than one intermediate reinforced region. For example, a netting material may comprise two reinforced intermediate regions, each reinforced intermediate region positioned equidistant from the centre of the netting material either side of the centre of the netting material.

In some embodiments, the reinforced edge region 21 comprises a higher strength than the strength of the reinforced intermediate region 31. With reference to the embodiment of FIG. 9A, in use, the central second reinforced portion is folded about longitudinal lines 37, 38 and 39 to form a double-layered area 40 as shown in FIGS. 11A and 11B. In folding the netting to form double-layered area 40, the two corresponding rows of eyelets 35*a*, 35*b* in the reinforced intermediate region of the netting material are brought together so that they form a single double-layered row 36 of eyelets 35*a*, 35*b*, as described above. As the area comprises two layers of netting for securing the netting, the strength of the reinforced intermediate region 31 may be reduced compared to the strength of the reinforced edge region 21. For example, the strength of the reinforced intermediate region 31 may be about half the strength of the reinforced edge region 21 so that the strength of the double-layered row 36 of eyelets is about the same as the strength of the row 25 of eyelets in the reinforced edge region. In FIGS. 11A and 11B the area 40 is illustrated as a longitudinal flap folded on fold lines 37, 38 and 39. However, in use, the double layers of area 40 may separate other than at the double-layered eyelets, the wire 50 or other fasteners 51 passing through the double-layered eyelets retaining two layers together only at the double-layered eyelets. Alternatively, area 40 may form a flap as illustrated by joining fold lines 37 and 39 together, for example by stitching, tying, knitting or bonding together.

Loops 51, for example wire loops, are illustrated in FIG. 11B passing through the doubled-layer row 36 of eyelets. Alternatively or additionally, the loops may extend around the wire 50 threaded through the doubled-layer row of eyelets 36. The netting may be hung from a support wire 52 passing through the loops 51. The longitudinal edges of the netting may be similarly supported, by loops 51 through the eyelets 22 or other fastening feature of the reinforced edge portion and/or by loops 51 extending around a wire threaded through the row of eyelets 22.

Figure 13:
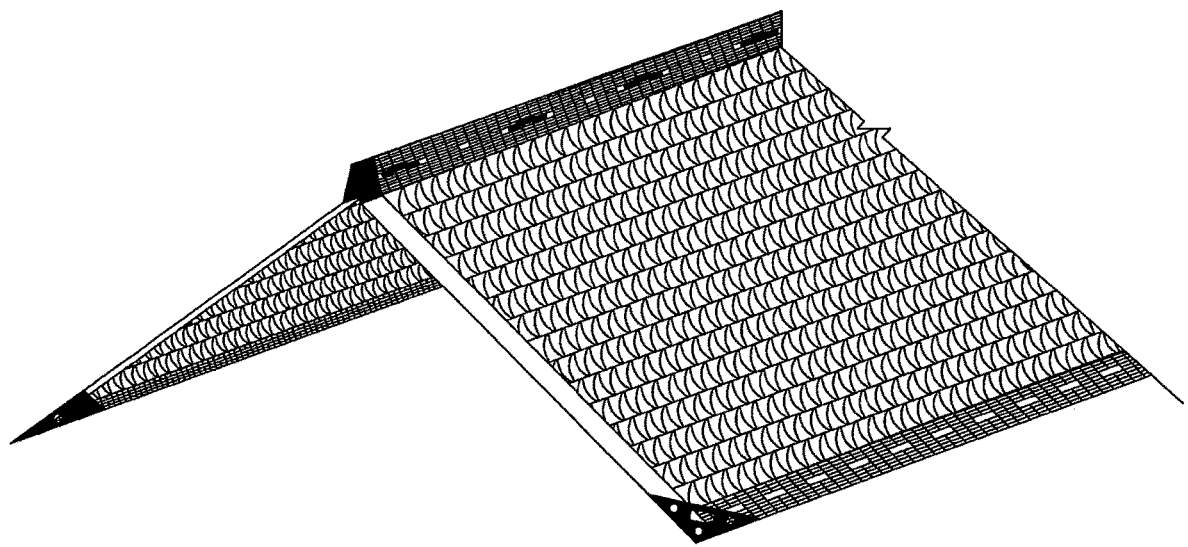
FIG. 13 is a part view of a netting material like that of FIG. 9 showing the netting material in use. The netting material has a reinforced belt material at lateral edges of the netting material and plastic reinforcing components on the corners of the netting material for additional strength.

In some embodiments as shown in FIG. 13 there is a woven webbing material sewn onto the lateral edges of the material. This is further strengthened with injection moulded plastic corners and injection moulded plastic caps on the folded centre reinforced region.

In some embodiments the reinforced intermediate region may be described as having a third knitted or woven construction. In some embodiments, threads of the first knitted or woven construction 11 and the third knitted or woven construction 31 comprise a first strand and threads of the second knitted or woven construction comprise a said first strand and at least one additional strand. In such a construction, the same thread type may be used to knit or weave the first knitted or woven construction and the third knitted or woven construction. Additional strength of the third construction compared to the first construction may be achieved by a different knit or weave pattern. The first construction may comprise a first knit or weave pattern and the third construction may comprise a second knit or weave pattern to reinforce the reinforced intermediate region. It may not be necessary to increase the thread strength in the reinforced intermediate region since this region is doubled up in use as described above. In some embodiments, the same knit or weave pattern used in the second construction may also be used in the third construction. However, to increase the strength of the reinforced edge region to be higher than the strength of the reinforced intermediate region, a higher strength thread may be used in the reinforced edge region as described earlier. In some embodiments, the reinforced edge portion may be knitted or woven using a stronger or heavier thread than the reinforced intermediate portion. For example, the reinforced intermediate portion of the netting may be knitted with threads comprising a single 250 denier strand, and the reinforced edge portion of the netting may be knitted with threads comprising a single 500 denier strand.

The same knit or weave pattern may be used in both the second and third knitted or woven constructions (that is, in the third construction, the pattern from the second construction may be duplicated side-by-side), and the same thread makeup (comprising the same type of strand or strands) may be used in both the first and third constructions, and a higher strength thread used in the second construction (the higher strength thread comprising an additional strand or strands compared to the thread in the first and third constructions). Example cross sections of threads 14 for use in knitting or weaving the first construction 11 and the third construction 31 are provided in the first column of FIG. 12, and corresponding example cross sections of threads 24 for use in knitting or weaving the second construction 21 are provided in the second column of FIG. 12. Threads 14 of the first and third constructions 11, 31 comprise a first strand 17 and threads of the second construction comprise a said first strand 17 and at least one additional strand 27. In some embodiments, a said additional strand 27 is heavier than the first strand 17. In some embodiments, the additional strand 27 has the same properties as the first strand 17.

Figure 12:
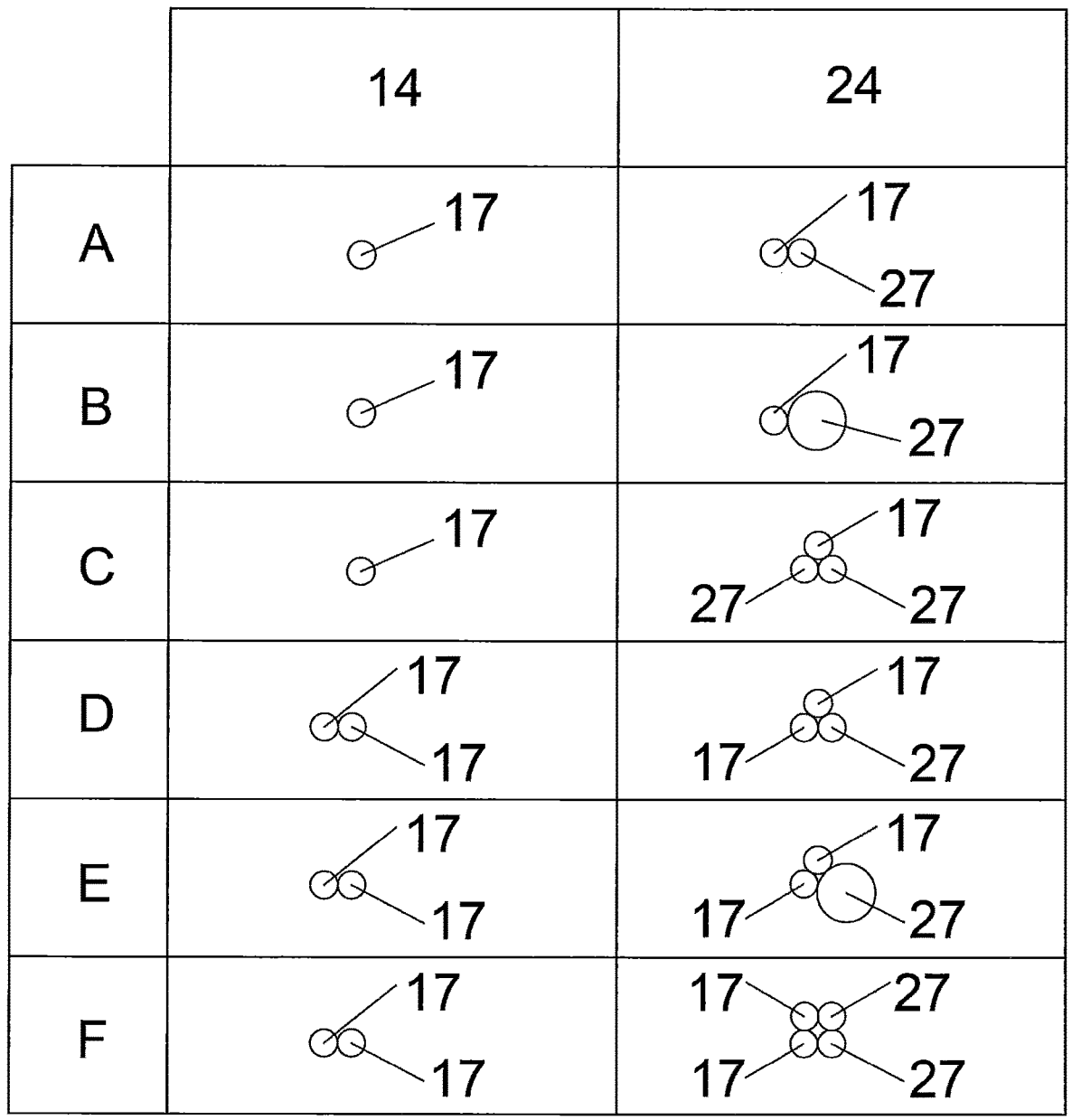
FIG. 12 shows example cross sections of threads for use in knitting the netting of FIG. 9, the first column of FIG. 12 illustrating threads for use in knitting a main portion and a second reinforced portion of the netting, and the second column of FIG. 12 illustrating corresponding example cross sections of threads for use in knitting a first reinforced portion of the netting.

In example A in FIG. 12, threads 14 of the first and third constructions 11, 31 comprise a first strand 17 and threads of the second construction 24 comprise two said first strands, the additional strand 27 being the same strand type as the first strand 17.

In example B in FIG. 12, threads 14 of the first and third constructions 11, 31 comprise a first strand 17 and threads of the second construction 24 comprise a said first strand and an additional thicker strand 27.

In example C in FIG. 12, threads 14 of the first and third constructions 11, 31 comprise a first strand 17 and threads of the second construction 24 comprise three said first strands, the two additional strands 27 being the same strand type as the first strand 17.

In example D in FIG. 12, threads 14 of the first and third constructions 11, 31 comprise two first strands 17 and threads of the second construction 24 comprise three said first strands, one additional strand 27 being the same strand type as the first strands 17.

In example E in FIG. 12, threads 14 of the first and third constructions 11, 31 comprise two first strands 17 and threads of the second construction 24 comprise two said first strands and an additional thicker strand 27.

In example F in FIG. 12, threads 14 of the first and third constructions 11, 31 comprise two first strands 17 and threads of the second construction 24 comprise four said first strands, the two additional strands 27 being the same strand type as the first strands 17.

In some embodiments, the threads of the first and third knitted constructions comprise a first lighter single strand 17 and threads of the second knitted construction comprise a heavier single strand 27 (example not provided in FIG. 12).

In some embodiments the main portion of the netting and the first and second reinforced portions of the netting may all be knitted from the same type of thread, the increased strength of the reinforced portions compared to the main portion of the netting achieved by using a different knit or weave pattern to the main portion of the netting only.

The foregoing describes the invention including a preferred form thereof, alterations and modifications as will be obvious to those skilled in the art are intended to be incorporated in the scope hereof, as defined in the accompanying claims.

The invention claimed is:

1. A netting material having a length extending in a first direction and a width extending in a second direction perpendicular to the first direction, the width being less than the length, the netting material formed by threads knitted or woven together, the netting material comprising:
    a main portion formed by the threads knitted or woven together, the main portion having a first knit or weave density, the main portion having apertures defined between said threads knitted or woven together, and
    an integral reinforced portion, the reinforced portion also formed by said threads knitted or woven together, the reinforced portion having a second knit or weave density that is greater than the first knit or weave density of the main portion, the reinforced portion comprising a first longitudinal row of knitted or woven fastening features, the first longitudinal row extending in the first direction, and the reinforced portion comprising a corresponding second longitudinal row of knitted or woven fastening features, the second longitudinal row also extending in the first direction, the first longitudinal row of fastening features and the second longitudinal row of fastening features spaced apart side-by-side in the second direction of the netting, the reinforced portion having an unfolded and folded configurations and being foldable and unfoldable along a longitudinal fold line extending in the first direction between the two rows of fastening features between unfolded and folded configurations, folding of the reinforced portion from its unfolded configuration to its folded configuration bringing the first longitudinal row of fastening features and the second longitudinal row of fastening features together to form a double-layered longitudinal attachment strip extending in the first direction for securing the netting material to a support structure.

2. The netting material of claim 1 wherein the netting material has first and second opposite longitudinal edges extending in the first direction, and wherein the netting material further comprises:
a first integral reinforced edge portion at or adjacent the first longitudinal edge and a second integral reinforced p at or adjacent the second longitudinal edge of, each reinforced edge portion comprising a longitudinal row of knitted or woven fastening features extending in the first direction,
wherein said integral reinforced portion is a reinforced intermediate portion between the reinforced edge portions, and
wherein the main portion comprises a first part extending between the reinforced intermediate portion and the first integral reinforced edge portion and a second part extending between the reinforced intermediate portion and the second integral reinforced edge portion.

3. The netting material of claim 2, wherein the main portion comprises a first knitted or woven construction the first and the second reinforced edge portions comprise a second knitted or woven construction, and
the reinforced intermediate portion comprises a third knitted or woven construction.

4. The netting material of claim 3, wherein the third knitted or woven construction comprises a knit or weave pattern repeated side-by-side.

5. The netting material of claim 3, wherein the second knitted or woven construction comprises a knit or weave pattern, and the third knitted or woven construction comprises the knit or weave pattern repeated side-by-side.

6. The netting material of claim 4, wherein the knit or weave pattern is a knit pattern comprising knitted pillars extending longitudinally of the netting material, wherein the first longitudinal row of fastening features in the reinforced intermediate portion is formed between a first two adjacent pillars and the second longitudinal row of fastening features in the reinforced intermediate portion is formed between a second two adjacent pillars, and wherein the fastening features in the reinforced intermediate portion are eyelets.

7. The netting material of claim 3, wherein the first knitted or woven construction comprises a first knit or weave pattern and the second knitted or woven construction comprises a second knit or weave pattern.

8. The netting material of claim 1, wherein the integral reinforced portion is a longitudinal central region of the netting material.

9. The netting material of claim 2, wherein the fastening features of the first and the second integral reinforced edge portions are eyelets.

10. The netting material of claim 1, wherein the fastening features of the integral reinforced portion are eyelets.

11. The netting material of claim 3, wherein a strength of the second knitted or woven construction is greater than a strength of the third knitted or woven construction.

12. The netting material of claim 3, wherein the first knitted or woven construction, the second knitted or woven construction and the third knitted or woven construction are knitted constructions comprising different knit densities.

13. The netting material of claim 12, wherein the threads knitted or woven together to form the netting material comprise single stranded threads.

14. The netting material of claim 13, wherein the single stranded threads have a denier of 200 to 600.

15. The netting material of claim 3, wherein threads of the first knitted or woven construction, the second knitted or woven construction and the third knitted or woven construction each comprise single stranded threads knitted or woven together, and wherein the second knitted or woven construction and the third knitted or woven construction comprise single stranded threads heavier than the single stranded thread of the first knitted or woven construction.

16. The netting material of claim 13, wherein each said single stranded thread is a monofilament.

17. A method of treating a plant or fruit or vegetables thereon which comprises providing over and/or adjacent the plant as bird netting, insect netting, shade netting, wind screen netting, or hail protection netting a netting material according to claim 1.

18. The netting material of claim 1, wherein the netting material has first and second opposite longitudinal edges, wherein said integral reinforced portion is spaced inwardly from one of said longitudinal edges and is a first integral intermediate reinforced portion and wherein the netting material comprises a second said integral reinforced portion and said second integral reinforced portion is spaced inwardly from the opposite longitudinal edge and from the first integral reinforced portion and is a second integral intermediate reinforced portion.

19. The netting material of claim 18 wherein the first integral reinforced portion and the second integral reinforced portion are spaced equidistant from a longitudinal centre of the netting material, the first integral reinforced intermediate portion on one side of the longitudinal centre of the netting material and the second integral reinforced intermediate portion on an opposite side of the longitudinal centre of the netting material.

20. The netting material of claim 1 wherein said integral reinforced portion is an integral reinforced edge portion at or adjacent a longitudinal edge of the netting material.

21. A netting material having a length dimension extending in a first direction, longitudinal edges aligned with the length, and a width extending in a second direction perpendicular to the first direction, the width being less than the length, the netting material formed by threads knitted or woven together, the netting material comprising:
a main portion extending longitudinally between said edges and comprising apertures defined between said threads knitted or woven together, and
a first integral reinforced edge portion at or adjacent one longitudinal edge of the netting material and a second integral reinforced edge portion at or adjacent an opposite longitudinal edge of the netting material, each said reinforced edge portion comprising a first longitudinal row of knitted or woven fastening features extending in the first direction and each said reinforced edge portion comprising a corresponding second longitudinal row of knitted or woven fastening features extending in first direction, the first longitudinal row of fastening features and the second longitudinal row of fastening features spaced apart side-by-side in the second direction of the netting each reinforced edge portion-ef having an unfolded and folded configuration and being foldable and unfoldable along a longitudinal fold line extending in the first direction between the two rows of fastening features between unfolded and folded configurations folding of each reinforced edge portion from its unfolded configuration to its folded configuration bringing the first longitudinal row of fastening features and the second longitudinal row of fastening features together to form a double-layered longitudinal attachment location extending in the first direction for securing the netting material to a support structure.

* * * * *

UNITED STATES PATENT AND TRADEMARK OFFICE
CERTIFICATE OF CORRECTION

PATENT NO. : 10,750,681 B2  
APPLICATION NO. : 14/889062  
DATED : August 25, 2020  
INVENTOR(S) : Jonathan Dallas Toye Page 1 of 1

It is certified that error appears in the above-identified patent and that said Letters Patent is hereby corrected as shown below:

In the Claims

Column 13, Claim 2, Line 12:
"p at or adjacent" should be: --portion at or adjacent--.

Column 13, Claim 3, Line 25:
"construction the" should be: --construction, the --.

Column 14, Claim 15, Lines 3-4:
"wherein threads of the first knitted" should be: --wherein the first knitted--.

Column 14, Claim 21, Line 39:
"a length dimension extending" should be: --a length extending--.

Column 14, Claim 21, Line 60:
"of the netting each" should be: --of the netting, each--.

Column 14, Claim 21, Line 60:
"edge portion-ef having" should be: --edge portion having--.

Column 14, Claim 21, Line 65:
"configurations folding" should be: --configurations, folding--.

Signed and Sealed this  
Eighth Day of December, 2020

Andrei Iancu  
*Director of the United States Patent and Trademark Office*